United States Patent [19]

Pool

[11] 4,393,650
[45] Jul. 19, 1983

[54] GAS TURBINE ENGINE HAVING AN AUTOMATIC ICE SHEDDING SPINNER

[75] Inventor: Francis C. Pool, Duffield, England

[73] Assignee: Rolls-Royce Limited, London, England

[21] Appl. No.: 236,045

[22] Filed: Feb. 20, 1981

Related U.S. Application Data

[63] Continuation-in-part of Ser. No. 222,750, Jan. 6, 1981, abandoned, which is a continuation of Ser. No. 887,418, Mar. 15, 1978, abandoned.

[30] Foreign Application Priority Data

Apr. 20, 1977 [GB] United Kingdom ............... 16318/77

[51] Int. Cl.³ .............................................. F02G 3/00
[52] U.S. Cl. .................................. 60/39.093; 60/909; 416/245 R
[58] Field of Search ................... 60/39.09 D, 39.09 P, 60/200 A; 137/15.1; 416/245

[56] References Cited

U.S. PATENT DOCUMENTS

| | | | |
|---|---|---|---|
| 2,401,247 | 5/1946 | Hunter | 416/245 |
| 2,534,662 | 12/1950 | Froom | 416/245 |
| 2,872,971 | 2/1959 | Clark et al. | 137/15.1 X |
| 2,924,282 | 2/1960 | Perryman | 416/245 |
| 3,121,545 | 2/1964 | Meletiou | 60/39.09 P |
| 3,148,043 | 9/1964 | Richardson et al. | 60/39.09 P |
| 3,175,355 | 3/1965 | Knauer | 137/15.1 |
| 3,199,602 | 8/1965 | Ratering | 416/245 |
| 3,426,981 | 2/1969 | Allcock | 137/15.1 X |
| 3,703,341 | 11/1972 | Garofalo | 416/245 |
| 3,933,327 | 1/1976 | Cook et al. | 60/39.09 D |
| 4,129,984 | 12/1978 | Nelson | 137/15.1 X |

OTHER PUBLICATIONS

"The Aircraft Gas Turbine Engine" by Pratt and Whitney Aircraft, May, 1974, pp. 64 and 65.
"Fiberglas-Reinforced Plastic as a Rocket Structural Material", Miller et al., *Jet Propulsion*, pp. 969-972, Nov. 1956.

*Primary Examiner*—Edward K. Look
*Attorney, Agent, or Firm*—Cushman, Darby & Cushman

[57] ABSTRACT

A gas turbine propulsion engine for aircraft of the type in which thrust is provided only from flow of exhaust gases or a combination of flow of exhaust gases and by-pass air, the engine having a cone-shaped spinner with a solid pointed tip portion and a main body portion. The tip portion has at least a surface made of a different material from the substantially rigid material of the main body portion, the at least surface of the tip portion being flexible relative to the body portion at operational rotations of the spinner whereby ice is automatically shed from the spinner due to cracks being developed at the bond between the tip portion and the main body portion. The cracks in the ice developed at the bond are propagated by the surface deflection of the remainder of the tip portion causing any accretion of ice thereon to shed from the remainder of the spinner.

10 Claims, 4 Drawing Figures

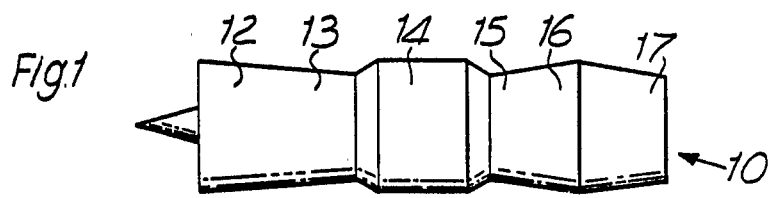
Fig.1
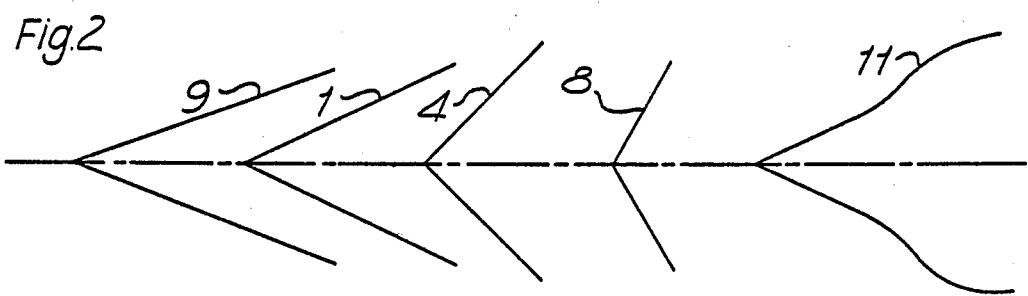
Fig.2
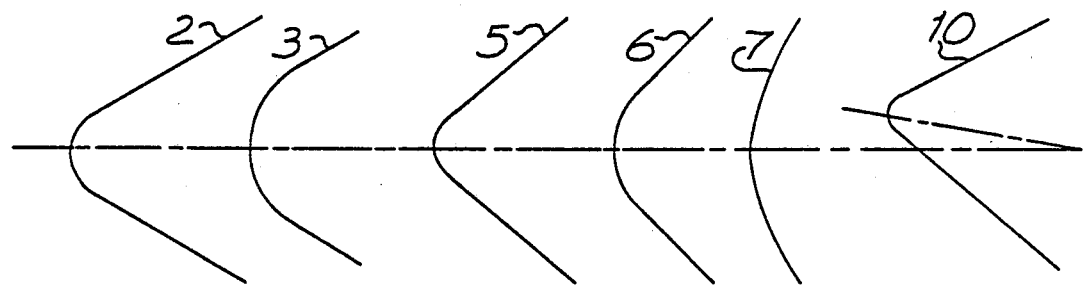
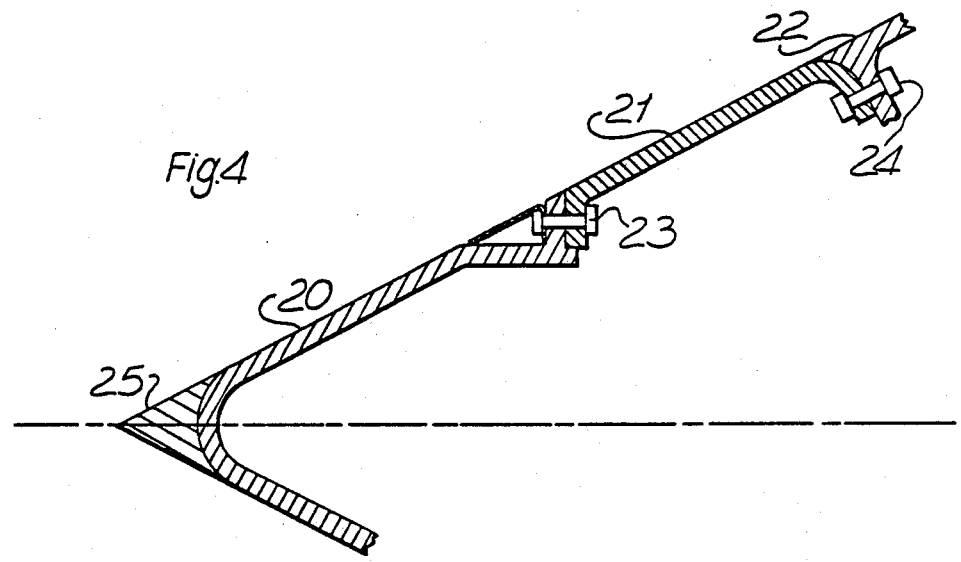
Fig.4

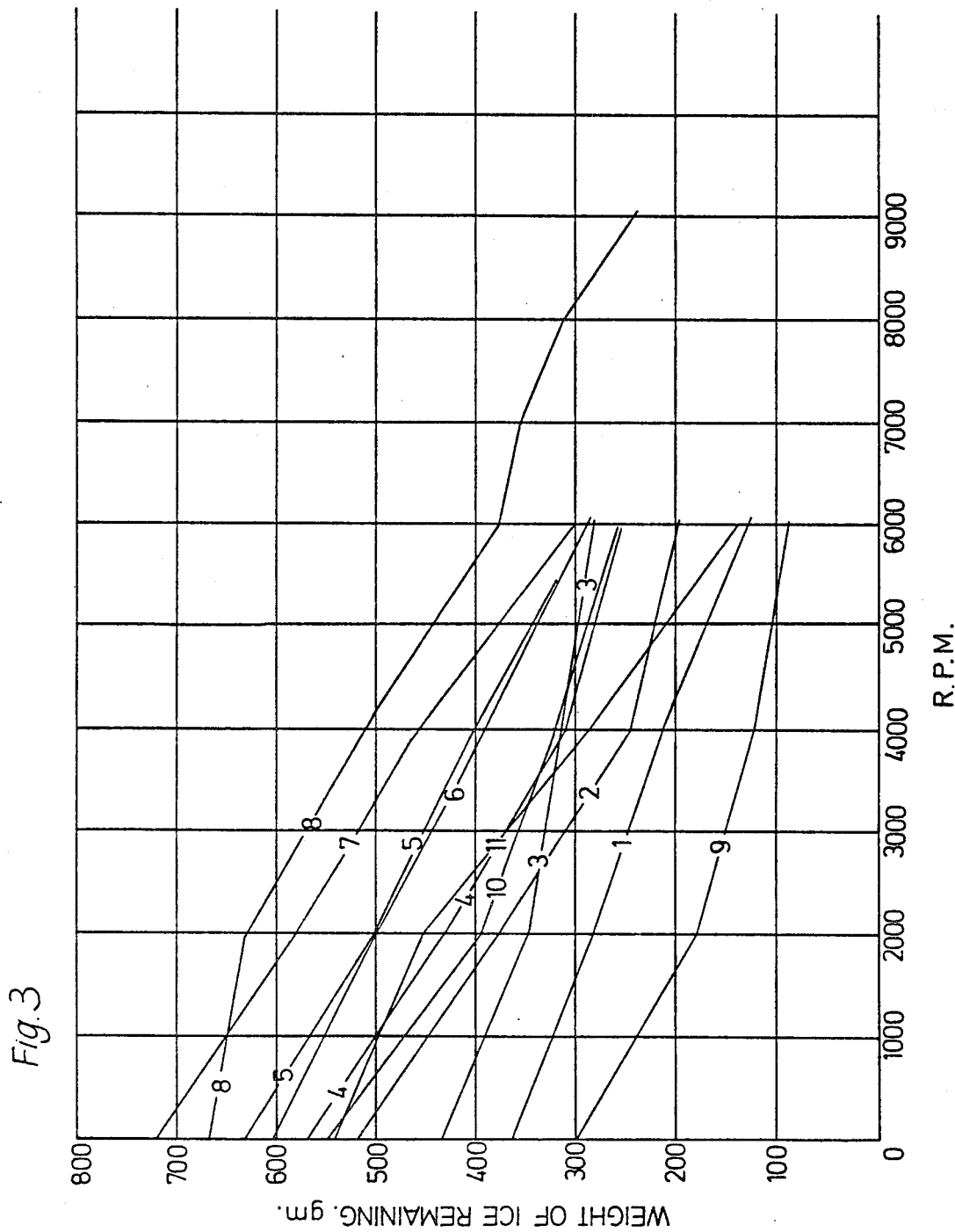

GAS TURBINE ENGINE HAVING AN AUTOMATIC ICE SHEDDING SPINNER

This application is a continuation-in-part of U.S. application Ser. No. 222,750, filed Jan. 6, 1981, now abandoned, which, in turn, was a continuation of U.S. application Ser. No. 887,418, filed Mar. 15, 1978, and now abandoned.

The present invention relates to a gas turbine propulsion engine of the type in which thrust is provided only from a flow of exhaust gases or only from a flow of a combination of exhaust gases and by-pass air, the gas turbine propulsion engine having an automatic ice shedding spinner. More specifically, the automatic ice shedding spinner is conically shaped and has a tip portion of short axial length relative the overall axial length. At least the surface of the tip portion is made of a different material from the rigid material of the main body portion, the surface being flexible relative to the main body portion of the spinner at operational rotations of the spinner whereby ice is automatically shed from the spinner due to cracks being developed at the bond between the tip portion and the main body portion of the spinner and then propagated over the entire surface of the spinner.

BACKGROUND OF THE INVENTION

Today there are three basic types of power plants for aircraft and in each of these power plants during operation, icing problems may develop necessitating anti-icing equipment. Two of these power plants each use propellers for developing a major portion of the thrust for the aircraft. The internal combustion engine utilizes a propeller with a spinner, whereas the turboprop power plant utilizes a gas turbine engine for driving the propeller to create the thrust, the propeller having a spinner. Both the conventional internal combustion engine and the turboprop engine rotate the propellers and their spinners at relative low speeds below about 2000 rpm. For example, the Rolls-Royce Limited GRIFFIN ® and MERLIN ® internal combustion engines have an operating speed of about 1500 rpm, whereas the Rolls-Royce DART ® turboprop engine and the TYNE ® turboprop engine have operating speeds of 1540 rpm and 960 rpm, respectively. On the other hand, the gas turbine propulsion engine which provides thrust for the aircraft only from flow of exhaust gases or a combination of flow of exhaust gases and by-pass air has operating speeds for its spinner considerably in excess of 3000 rpm. For example, the Rolls-Royce RB211 gas turbine propulsion engine has an operating range of approximately 4500 rpm for takeoff and 3750 rpm for cruise.

In all three power plants described above, the buildup of ice on the components thereof, and in particular on the spinners, must be particularly avoided, otherwise the ice may be shed from the spinner in large pieces causing severe damage to the engine of the aircraft or the ice may build up unevenly on the spinner, thereby resulting in vibrations to the engines. Heretofore, the best method of avoiding or reducing icing problems was to provide the spinner with anti-icing equipment which usually took the form of electrical heating elements in the spinner, the supply of deicing fluid to the outside surface of the spinner, or the supply of hot air to the interior of the spinner. Such anti-icing equipment, while usually quite effective in operation, did add weight and complexity to the engine.

Other efforts have been made to provide automatic anti-icing spinners for propeller driven aircraft, and these included providing a spinner made from a flexible material, the spinner being inflated to its desired shape to provide rigidity to the spinner surface while permitting sufficient distortion of the spinner surface to break up ice deposits. While this type of spinner could probably function in its intended manner on an internal combustion engine or a prop turbo engine wherein the operating ranges of the spinner speed are below 2000 rpm, it would be impractical to use such a spinner on a gas turbine propulsion engine of the conventional or fan jet type wherein thrust is provided only from flow of exhaust gases or a combination of flow of exhaust gases and by-pass air. The high speeds required for the spinners on the gas turbine propulsion engines would not permit the use of an inflated spinner of this type as too high centrifugal forces would be developed in the inflated spinner which would cause the spinner to vibrate and deform excessively and, thus, subject the engine bearings to excessive out of balance forces and unnecessary wear.

BRIEF DESCRIPTION OF THE INVENTION

The present invention relates to a gas turbine propulsion engine for aircraft of the type in which thrust is provided only from a flow of exhaust gases or a combination of flow of exhaust gases and by-pass air, the gas turbine propulsion engine having a cone-shaped spinner which rotates at high operational speeds above 3000 rpm. The spinner has a tip portion and a rigid main body portion. The tip portion has at least a surface made of a different material from the substantially rigid material of the main body portion of the spinner, the at least surface of the tip portion being flexible relative to the body portion at operational rotations whereby ice is automatically shed from the spinner due to cracks being developed at the bond between the tip portion and the main body portion and propagating over the entire surface of the spinner. The tip portion is solid and has an axial length which is relatively short compared to the overall axial length of the spinner, thereby eliminating development of excessive vibrational forces or deformation which would cause excessive out of balance forces on the bearings of the engine leading to deleterious effects. The tip portion has an axial length no greater than 75 mm. and no less than 50 mm., whereas the included angle of the conical spinner is substantially in the order of 57°. By having a spinner as described above, ice is automatically shed therefrom without the necessity of providing additional anti-icing equipment which would add weight to the engine.

Preferably, the main body portion of the spinner of the present invention is manufactured from either aluminum or glass reinforced plastic (G.R.P.), and the at least flexible exterior surface of the tip portion is manufactured from a silicon elastomeric material.

An ancillary advantage of the present invention is that the flexible tip portion on the spinner may be provided with a point rather than being rounded. By being flexible, handling hazards to personnel are reduced. By having a point on the tip portion of the spinner rather than rounding the same off, there is less chance of ice buildup at low speeds as in the case of a rounded end on a tip portion.

PRIOR ART

The following prior art appeared to be the most relevant cited in the parent application Ser. No. 887,418, and it is requested that this art be made of record: U.S. Pat. Nos. 2,401,247 Hunter May 28,1946; 3,121,545 Meletiou Feb. 18, 1964; 3,426,981 Allcock Feb. 11, 1969; 3,933,327 Cook et al. Jan. 20, 1976; 4,129,984 Nelson Dec. 19, 1978; Pratt & Whitney Aircraft "The Aircraft Gas Turbine Engine And Its Operation", May, 1974, pages 64–65.

The Hunter U.S. Pat. No. 2,401,247 discloses a spinner assembly for either an internal combustion engine or a prop turbo engine, the spinner assembly being inflatable to its proper shape and flexible. The axial length of the spinner assembly is large with respect to the overall axial length of the spinner assembly and the propeller hub. Such a unit would be impractical where the spinner operates at exceedingly high rpms, such as rpms of a spinner of a gas turbine propulsion engine which provides thrust only from flow of exhaust gases or a combination of flow of exhaust gases and by-pass air.

The Nelson U.S. Pat. No. 4,129,984 discloses an anti-icing facility for a spinner or hub of a gas turbine propulsion engine. To obtain automatic anti-icing, a rather complex shaped spinner is provided with a pointed conical upstream part of limited angle of divergence followed by a toroidally surfaced concave intermediate part and then followed by a convex toroidal part blending the intermediate part with the hub of the spinner. Aerodynamic flow characteristics over such a spinner are not as good as those in a truly conical spinner as there would be pressure drops in the area of the toroidal concaved intermediate portion.

The Allcock U.S. Pat. No. 3,426,981 discloses a deformable stationary inlet for guarding the inlet of a gas turbine engine and preventing ingestion of foreign bodies. The hollow stationary vanes may be provided with hot air for deicing purposes, thus necessitating added equipment.

The remaining art referred to above is not as relevant as that discussed in detail. However, this art does recognize the problem of icing in various types of power plants.

BRIEF DESCRIPTION OF THE DRAWINGS

For better understanding of the invention, an embodiment thereof will be more particularly described by way of example only and with reference to the accompanying drawings in which:

FIG. 1 shows a pictorial view of a gas turbine engine made in accordance with an embodiment of the present invention;

FIG. 2 shows several diagrammatic views of spinners evaluated during the development of the present invention;

FIG. 3 shows a graph of some of the results of tests carried out on the spinners; and FIG. 4 shows a cross-sectional view in greater detail of a spinner made in accordance with an embodiment of the present invention.

DETAILED DESCRIPTION OF THE INVENTION

Referring to the drawings, a gas turbine propulsion engine shown generally at 10 comprises in flow series a low pressure compressor 12, a high pressure compressor 13, combustion equipment 14, a high pressure turbine 15 and a low pressure turbine 16, the engine terminating in an exhaust nozzle 17. Situated at the upstream end of the engine 10 is a spinner 18 made in accordance with the present invention.

The present invention is restricted to the gas turbine propulsion engine 10 being of the type which produces thrust for the aircraft only from the flow of exhaust gases or a combination of flow of exhaust gases and by-pass air. The gas turbine propulsion engine 10 may be what is referred to in the industry as a fan jet engine in which the fan represents a low pressure compressor and a portion of the air from the fan bypasses the combustion equipment and turbine means and is either discharged concentrically of the exhaust gases or is mixed with the exhaust gases and discharged through the exhaust nozzle. The rotational speed of the spinner 18 at operating conditions of flight is at least 3000 rpm and may be as high as 4500 rpm.

FIG. 2 shows a total of eleven shapes which were checked over a range of icing conditions in a wind tunnel. Indirect viewing of the spinner during the tests was done via a mirror and closed circuit T.V. in conjunction with a strobe light. Ice accretions during the test were recorded by a micro-second flash and camera unit.

A selection of air temperatures and spinner rotaional speeds was made in the following ranges.

Tunnel air temperatures of $-5°$ C., $-10°$ C. and $-20°$ C., and spinner rotational speeds of 0, 2000, 4000 and 6000 rpm were shown to be adequate for most of the spinner shapes. A constant tunnel nozzle air velocity of 300 ft./sec. was used throughout the tests, and this represents a fair velocity which would be encountered over a range of types of gas turbine engines. Water concentration values were 1.5, 1.4 and 1 gm./$M^3$ for the temperatures of $-5°$, $-10°$ and $-20°$ C., respectively.

The tests on each spinner were run for 10 minutes each with ice accretions being monitored visually and by camera at 1 minute intervals. Vibration levels were also monitored to give some indication of the increases in levels to be expected when partial ice shedding took place.

At the conclusion of the 10 minutes period, the spinner speed was reduced to zero; the tunnel stopped and a small amount of warm air introduced to the center of the spinners to assist ice removal. The total accretion was then weighed and measured.

The tunnel was then warmed up to clear any residual ice in the ducting to reduce to a minimum the possibility of local upstream accretions breaking away in a subsequent test and possibly influencing the results by disturbing ice accretion in the spinner. Rotational speeds and tunnel velocity were maintained within 1% and air temperatures within $\pm 0.5°$ C. of the nominal test temperatures.

The results of some of the tests on the eleven types of conventional rigid spinner are shown graphically at FIG. 3. These are plotted for the three temperatures in terms of the weight of ice remaining after the 10 minute icing period against the spinners' rotational speeds.

For conventional rigid type spinners, it will be observed that the straight sided conical spinner with a 45° included angle terminating in a sharp point (Profile 9) is by far the most efficient shape with regard to minimum total ice accretion. The spherical shape with the leading edge radius of approximately 9 inches radius (Profile 7) was the worst shape of its type as regards total accretion.

The main objections to the conical spinner of 45° included angle are those of increased weight and length over the more conventional spinner. This could give rise to problems in aircraft gas turbine engines for fitment into a buried wing or tail aircraft installation. The second most efficient rigid shape was the 57° included angle spinner shown as Profile 1. However, it appears that this shape will collect approximately 60% more ice in the range of 2000 to 6000 rpm.

A flexible tip was attached to the 45° and 57° nose cones, and it was found that this helped to assist in the accretion to shed ice more frequently. It is believed that ice shedding is promoted by the local high stress levels produced by surface deflection at the bond between the ice and the rubber tip and is also assisted by centrifugal force. A solid rubber tip portion having an axial length of 75 mm. was fitted to both the 45° and 57° included angle spinners. The overall axial length of the 45° spinner was substantially 375 mm., whereas the overall axial length of the 57° spinner was substantially 290 mm.

Further tests showed that the 57° included angle spinner was then comparable with the 45° spinner without a flexible tip portion. The performance of the latter improved still further by carefully blending the joint between the rubber of the flexible tip portion and the metal body portion of the spinner. It appeared that misalignment or distortion of the rubber would produce a local wake resulting in ice building up behind the joint.

It was observed that the solid rubber tip portion tends to distort at the nose with rotational speeds above 4000 rpm, particularly on the 45° included angle spinner. It is considered that the length of the rubber tip portion could be reduced from 75 to 50 mm. without affecting its performance, and if the rubber is molded onto a central metal or glass reinforced plastic (G.R.P.) core, this would stiffen up the whole tip without reducing its flexible surface.

As the use of a sharp point on a spinner without a flexible tip could introduce a handling hazard to personnel, a number of tests were conducted to ascertain the effect of increasing the spinner tip radius. It was found that even with a 3 mm. radius tip, there was a measurable increase in ice accreted at lower speeds. It was therefore decided that a radius of 2 mm. should be recommended as the maximum and this would be practicable to achieve in rigid materials.

FIG. 4 of the drawings shows a design of spinner suitable for use in the gas turbine propulsion engine 10 and made in accordance with the present invention. The spinner 18 has an included angle of 57°, and portions 20 and 21 which define the rigid main body portion of the spinner 18 are manfactured from glass reinforced plastic, or alternatively aluminum. The portions 20 and 21 are secured both to each other and to the engine structure 22, respectively, by means of two circumferentially disposed sets of axially extending bolts, one bolt from each set being shown at 23 and 24. At the upstream end of the spinner is provided the solid rubber pointed cone-shaped tip portion 25 which is bonded to the member 20. The rubber tip portion 25 may be manufactured from any suitable elastomeric material such as, for example, silicon rubber. As previously mentioned, solid tip portion 25 may have a metallic core or a glass reinforced plastic (G.R.P.) core so long as the external surface is covered with a suitable flexible or elastomeric material.

What is claimed is:

1. In a gas turbine propulsion engine for aircraft in which thrust is provided only from flow of exhaust gases or a combination of flow of exhaust gases and by-pass air, said engine having an air inlet and an exhaust gas outlet, the improvement in a spinner positioned in the forward end of said air inlet for automatically shedding ice accretions at operational rotations of the engine, said spinner comprising:

a conical member having an included conical angle of substantially 57°, said conical member having a frusto-conical main body portion and a solid pointed cone-shaped tip portion attached thereto by a bond, said solid pointed cone-shaped tip portion of said spinner having an axial length relatively shorter than an axial length of said frusto-conical main body portion and said axial length of said solid pointed cone-shaped tip portion being no greater than 75 mm. and no less than 50 mm., said frusto-conical main body portion being manufactured from a material rigid at operational rotations of the spinner, and said solid pointed cone-shaped tip portion having at least a surface made of a different material from and flexible relative to said rigid material of said frusto-conical main body portion, said different material of the at least said surface of said solid pointed cone-shaped tip portion being flexible at said bond during operational rotation of the spinner causing local high stress levels to be produced and cracks propagated in any ice at said bond with surface deflection of the remainder of the at least said surface of said solid pointed cone-shaped tip portion causing any accretion of ice thereon to shed from the remainder of the spinner.

2. A gas turbine propulsion engine as claimed in claim 1 in which the main body portion of the spinner is manufactured from aluminum.

3. A gas turbine propulsion engine as claimed in claim 1 in which the main body portion of the spinner is manufactured from glass reinforced plastic.

4. A gas turbine propulsion engine as claimed in claim 1 in which at least said surface of flexible material of said solid pointed cone-shaped tip portion of said spinner is manufactured from a silicon elastomeric material.

5. A gas turbine propulsion engine as claimed in claim 1 in which said solid pointed cone-shaped tip portion of said spinner includes a central core on which the at least said surface of flexible material is molded.

6. A gas turbine propulsion engine as claimed in claim 1 in which said solid pointed cone-shaped tip portion has a point with a radius no greater than 2 mm.

7. A gas turbine propulsion engine as claimed in claim 1 in which said solid pointed cone-shaped tip portion is manufactured entirely from a silicon elastomeric material.

8. A gas turbine propulsion engine as claimed in any of claims 1 to 7 in which said conical member has an overall axial length in a range of substantially 290 mm. to 375 mm.

9. A gas turbine propulsion engine as claimed in any of claims 1 to 7 in which said conical member has an overall axial length in the order of 290 mm.

10. In a gas turbine propulsion engine for aircraft in which thrust is provided only from the flow of exhaust gases or a combination of flow of exhaust gases and by-pass air, said engine having an air inlet and an exhaust gas outlet, the improvement in a spinner positioned in the forward end of said air inlet for automatically shedding ice accretions at operational rotations of the engine, said spinner comprising:

a conical member having an included conical angle in the range of substantially 45° to substantially 57° and an overall axial length in the range of substantially 290 mm. to 375 mm., said conical member having a frusto-conical main body portion and a solid pointed cone-shaped tip portion attached thereto by a bond, said solid pointed cone-shaped tip portion of said spinner having an axial length relatively shorter than an axial length of said frusto-conical main body portion and said axial length of said solid pointed cone-shaped tip portion being no greater than 75 mm. and no less than 50 mm., said frusto-conical main body portion being manufactured from a material rigid at operational rotations of the spinner, and said solid pointed cone-shaped tip portion having at least a surface made of a different material from and flexible relative to said rigid material of said frusto-conical main body portion, said different material of the at least said surface of said solid pointed cone-shaped tip portion being flexible at said bond during operational rotation of the spinner causing local high stress levels to be produced and cracks propagated in any ice at said bond with surface deflection of the remainder of the at least said surface of said solid pointed cone-shaped tip portion causing any accretion of ice thereon to shed from the remainder of the spinner.

* * * * *